US009221046B2

(12) United States Patent
Petrek et al.

(10) Patent No.: US 9,221,046 B2
(45) Date of Patent: Dec. 29, 2015

(54) AIR DISPLACEMENT PIPETTE WITH ENHANCED BLOWOUT

(71) Applicant: Rainin Instrument, LLC, Oakland, CA (US)

(72) Inventors: James S Petrek, Danville, CA (US); David M Johnson, San Francisco, CA (US)

(73) Assignee: Rainin Instrument, LLC, Oakland, CA (US)

( * ) Notice: Subject to any disclaimer, the term of this patent is extended or adjusted under 35 U.S.C. 154(b) by 150 days.

(21) Appl. No.: 14/169,038

(22) Filed: Jan. 30, 2014

(65) Prior Publication Data

US 2015/0209777 A1 Jul. 30, 2015

(51) Int. Cl.
*B01L 3/02* (2006.01)
*G01N 1/14* (2006.01)

(52) U.S. Cl.
CPC ............. *B01L 3/0224* (2013.01); *B01L 3/0217* (2013.01); *B01L 3/0231* (2013.01)

(58) Field of Classification Search
CPC ............................ B01L 3/0217; B01L 3/0231
USPC ............................ 73/864.16, 864.17, 864.18
See application file for complete search history.

(56) References Cited

U.S. PATENT DOCUMENTS 4,061,037 A * 12/1977 Keegan ................ B01L 3/0231 422/927
5,770,160 A * 6/1998 Smith ................. B01L 3/0217 422/525
5,817,955 A * 10/1998 Gherson ................. B01L 3/02 417/535
6,499,363 B1 * 12/2002 Morimoto ............ B01L 3/0231 73/864.01

* cited by examiner

*Primary Examiner* — Lisa Caputo
*Assistant Examiner* — Roger Hernandez-Prewitt
(74) *Attorney, Agent, or Firm* — Clark A. Wixon

(57) ABSTRACT

An air displacement pipette includes a segmented, stepped piston configured to displace additional air at a higher velocity during a blowout stroke, thereby enabling improved dispensing accuracy by more completely dislodging adhering liquid from a pipette tip following the preceding dispensing stroke.

22 Claims, 7 Drawing Sheets

*Fig.* 2

PRIOR ART

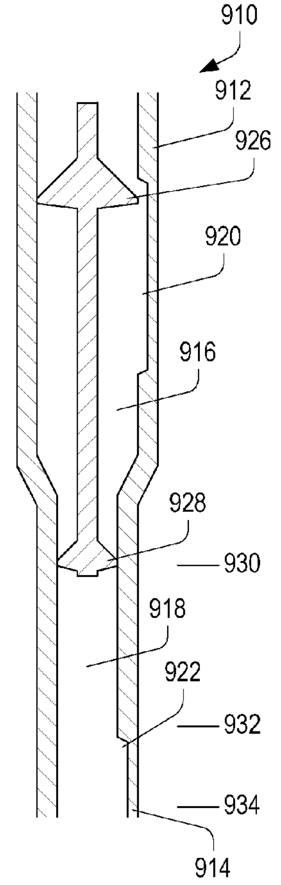
*Fig.* 9
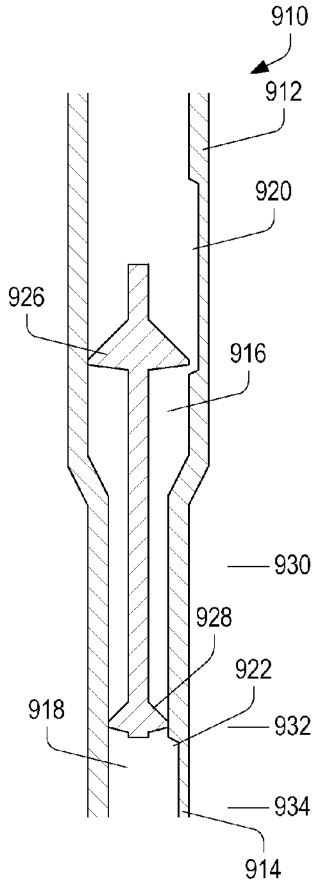
*Fig.* 10
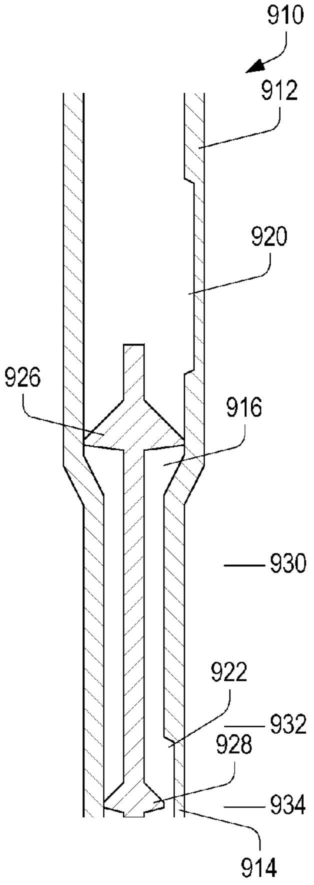
*Fig.* 11

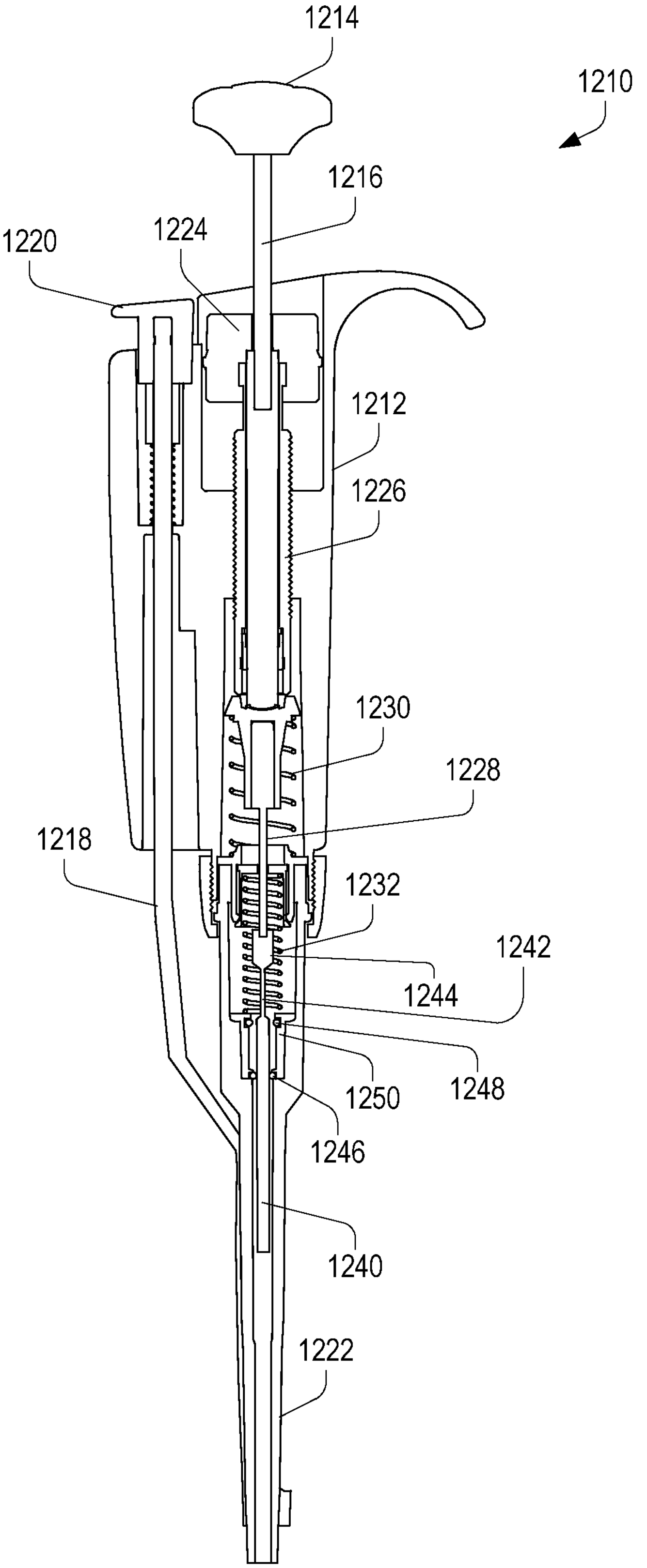
*Fig.* 12

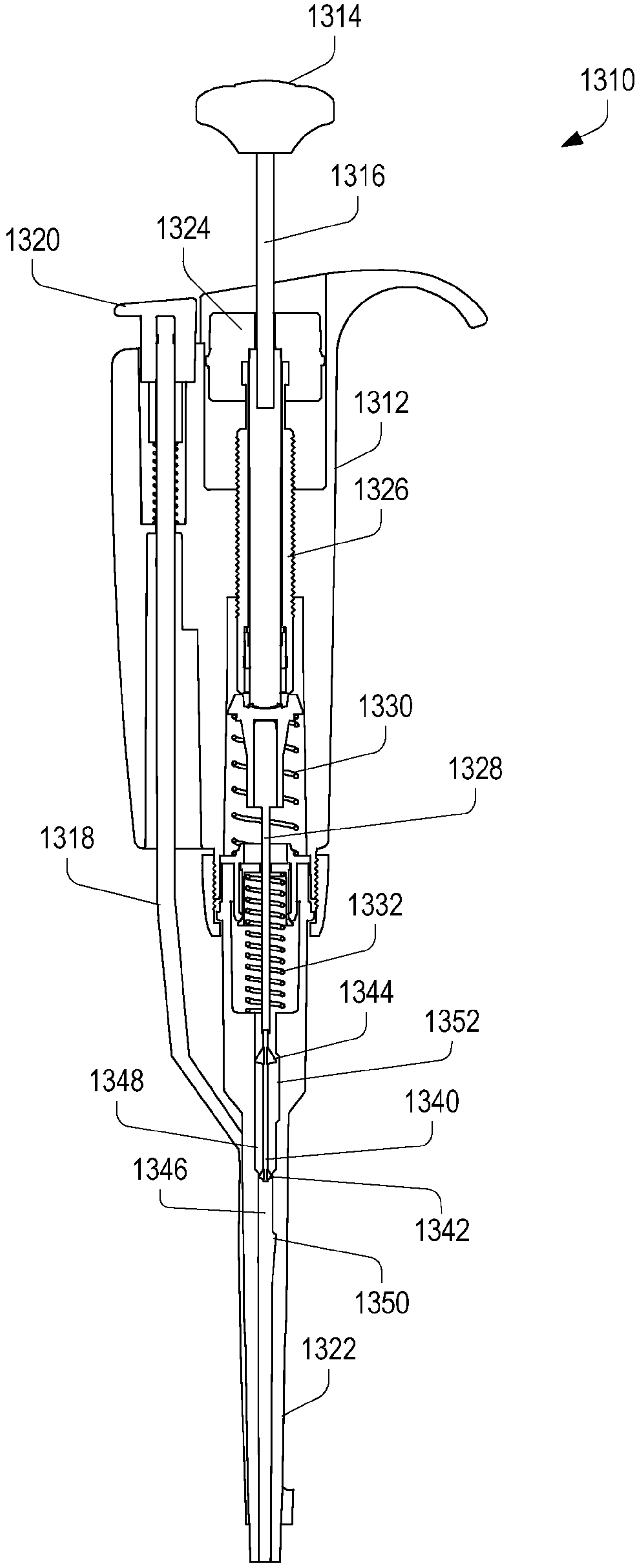
*Fig.* 13

AIR DISPLACEMENT PIPETTE WITH ENHANCED BLOWOUT

FIELD OF THE INVENTION

The invention relates to air displacement pipettes, and particularly to air displacement pipettes with an enhanced blowout stroke capable of more fully discharging adhering liquid than traditional air displacement pipettes.

BACKGROUND OF THE INVENTION

Handheld pipettes are commonly used to dispense or transfer small but accurately measured quantities of liquids.

U.S. Pat. No. 5,700,959, for example, describes a commercially available single channel air displacement manual pipette. Such pipettes generally include an elongated hand-holdable pipette body housing an upwardly spring biased plunger unit. The plunger unit is supported for axial movement in the pipette body between a first or upper stop position in which an end portion of the plunger unit extends from an upper end of the pipette body. A pipette user grips the pipette body with his or her thumb over the exposed end of the plunger unit. Downward thumb action on the plunger unit moves the plunger unit downward from its upper stop position against the upward bias of a return spring toward a home position, and on against the return spring and a second spring to a second or a lower stop position at which the measured fluid is expelled from a disposable tip secured to the pipette.

In the commercially available pipettes, as described in the foregoing patent, the home position is defined by a "soft" stop. The soft stop comprises a second relatively stiff spring mechanism, often referred to as a "blowout" spring, within the pipette body which is installed in a somewhat preloaded state, but further activated when the plunger unit reaches the home position. As the pipette user manually moves the plunger unit from its upper stop position by pressing downwardly with his or her thumb on the exposed end of the plunger unit, the pipette user can "feel" an increased resistance to movement of the plunger unit associated with an activation of the second spring assembly opposing further downward movement of the plunger unit. The position of the plunger unit where the user feels the activation of the second spring mechanism defines the home position for the plunger unit. Continued movement of the plunger unit beyond the home position to the lower stop position is resisted by a combination of the return spring and the second spring mechanism. The volume of the pipette is defined by the distance between the upper stop and the soft "home position" stop, and accordingly, the tactile feel of the home position—the transition between the two spring resistances—is an important characteristic of a manual pipette.

Air displacement pipettes are the most common variety of handheld pipettes. In an air displacement pipette, a controllable piston is mounted for movement axially within a chamber in the pipette; the piston moves in response to either manual control (as described above) or motorized electronic control. Typically, the piston moves in a chamber in the liquid end, or shaft, of the pipette, to which disposable pipette tips may be mounted.

An air tight seal is formed between the piston and the shaft. With such a seal in place, axial movement of the piston will vary the size of the airspace within the shaft. Moving the piston downward, into the shaft, will reduce the airspace and force air out of the shaft through an open distal end. Moving the piston upward, out of the shaft, will increase the airspace and cause air to be drawn into the shaft through the open end.

The seal between the piston and the shaft is generally formed with a compressed O-ring, a skirted seal, a lip seal, or a similar structure, fabricated from a material that provides satisfactory long-term performance. For example, a piston seal structure may be made from polyethylene combined with PTFE, which has been found to offer good sealing performance and wear resistance and reliability over a period of months to years. Other configurations are possible, including various dry or lubricated seals.

A disposable pipette tip is then sealed to a nozzle at the open distal end of the shaft. Then, as the piston is moved within the shaft, air—or a measured quantity of liquid equal in volume to the displaced air—is drawn into or forced out of the tip. With both the piston and the tip sealed to the shaft, the only entry and exit path should be the distal open end of the disposable pipette tip. Because of the sealed system, air displacement pipette may be used to make accurate and precise measurements, and to move carefully calibrated quantities of liquids.

In pipetting liquids with traditional manual air displacement pipettes, the pipette user grasps the pipette housing with his or her thumb on top of the exposed end of the plunger unit. Exerting downward thumb pressure on the plunger unit, the user moves the plunger unit away from the upper stop position against the force of the return spring. The user detects the home position for the plunger unit during movement of the plunger unit away from the first stop position by sensing the start of an increase in the downward force required to move the plunger unit. Such increase force is the result of movement of the plunger unit against the return spring and the preloaded second spring mechanism, commonly referred to as a "blowout" spring mechanism. Then, with the tip inserted in the liquid, the user manually controls the rate of return of the plunger unit from the home position to the upper stop position.

Subsequently, to dispense the liquid, the user removes the tip from the liquid and maneuvers it to a position above a receptacle, then depresses the plunger unit gradually to the soft stop at the home position, then beyond the home position through a blowout stroke. The volume of liquid discharged during the downward main stroke between the upper stop position and the home position should, in theory, be equal to the volume of liquid aspirated while moving the plunger unit upward over the same stroke. In practice, however, some liquid may cling to the disposable tip, either on an interior surface or as a droplet on the bottom, or both. Additional air discharged from the pipette during the blowout stroke, between the home position and a fixed lower stop, assists in removing this remaining liquid. However, in most commercially available pipettes, the blowout stroke is relatively short—as a practical consequence of the limited possible stroke length when the plunger unit is to be controlled by a user's thumb. Such a short blowout stroke may not be sufficient to remove substantially all of the remaining liquid. Any remaining liquid that has not been successfully dispensed may tend to adversely affect the accuracy of a liquid dispensing operation performed via pipette. This is particularly true in the case of low-volume pipettes, especially those handling 50 μl or less. With low-volume pipettes, the ratio of adhering liquid to the desired sample size may be especially high.

To remove the remaining liquid—to the extent it is hanging as a drop at the bottom of a tip—a user may attempt to "touch off" and tap the distal end of the tip against the side of the receptacle. However, it may not always be practical to touch off in all circumstances, and not all adhering liquid may be removed this way. Automated or robotic liquid handling systems may not have the freedom to touch off against the side of a receptacle, or a protocol may not permit it. Moreover, liquid transferred to the side wall of a receptacle in this way might remain as a separate drop on the side wall, and in some cases might not rejoin the rest of the discharged sample as a user might desire.

This problem is well known and there have been some attempts made to solve it. U.S. Pat. No. 5,696,330 to Heinonen discloses a manual air displacement pipette that includes two concentric pistons—a "dosing piston" 18 that performs the primary liquid aspiration and dispending between the piston's upper position and its home position, and a secondary and separately movable "removing piston" 13 that moves during the blowout stroke to expel additional air and detach droplets. During a downward stroke of the Heinonen pipette, only the dosing piston is operative between the upper stop and the home position. At the home position, the dosing piston engages and causes movement of the secondary removing piston. Although this design will certainly discharge more air during blowout, it includes an excess of moving parts with tight tolerances, which may lead to long-term unreliability concerns and additional manufacturing expenses.

U.S. Pat. No. 8,318,108 to Suovaniemi et al. attempts to solve the problem in a slightly different manner—by using a single piston, but accelerating it during a blowout stroke. This too will discharge more air, more quickly during blowout, which will indeed tend to provide more effective blowout characteristics. However, because piston movement in a traditional manual handheld pipette is controlled by the user, the Suovaniemi technique is best implemented in an electronic pipette under motorized control. It is possible to design a fully manual pipette with this movement characteristic imparted to the piston entirely through mechanical means through a two-speed linkage, but this design would be more complex and once again employ more moving parts. And to discharge more air during a blowout stroke, even if accelerated, it may be necessary to lengthen the piston stroke of the pipette, which may in turn require lengthening the pipette to a size greater than a user might otherwise prefer.

Accordingly, there is a continuing need for a manual air displacement pipette with enhanced and improved blowout characteristics. Such a pipette would offer an increased ability to remove any remaining or adhering liquid from a pipette tip without substantially increased complexity, size, cost, or operational difficulties.

SUMMARY OF THE INVENTION

A handheld pipette according to the invention addresses some of the shortcomings of presently commercially available handheld pipettes, as described above.

Like prior conventional manual pipettes, the disclosed embodiment of the present invention comprises a hand holdable pipette body having a return spring biased plunger unit supported therein for axial movement from a first or upper stop position. To transfer a quantity of liquid, the user first sets the pipette to a desired volume setting, as indicated on a volume display on the pipette. Non-adjustable fixed-volume pipettes are, of course, available, but the most common handheld pipettes are volume adjustable as described herein.

The user then inserts the shaft of a pipette into a disposable tip, which becomes fixed to the end of the shaft. The user depresses a plunger button (which often also serves as a volume adjustment knob) to a tactile "home" position, dips the end of the tip into a liquid, and slowly releases the plunger button to bring the liquid into the pipette tip. All liquid remains in the disposable tip, and hence, removal and disposal of a tip prevents cross-contamination between samples upon subsequent uses of the pipette.

To dispense, the user moves the tip out of the initial liquid sample and positions it over a receptacle. As with prior manual pipettes, a pipette user holding the pipette of the present invention presses on the plunger button to move the plunger unit from the first stop position against the return spring, through the "home" position, to a second or lower stop position wherein the measured fluid contained in the pipette tip is expelled from the tip. The pipette user then allows the return spring to return the plunger to a "home" position adjacent the lower stop position. The "home" position is defined by a "soft" stop and is the starting position to which the plunger unit is returned for the start of each successive aspiration operation with the pipette. In particular, any downward movement of the plunger unit beyond the "home" position activates the "blow out" spring which generates a stronger upward force in opposition to such downward movement of the plunger unit. The pipette user senses or "feels" the start of the increase in the return force which provides the user an indication that the plunger unit has reached and is at the "home" position.

An embodiment of the pipette disclosed herein includes a segmented, stepped air displacement piston and a plurality of piston seals to enable an enhanced blowout stroke.

In an upper stroke portion, where the plunger unit is moved between the upper stop and the home position, a relatively narrow distal segment of the piston moves through a lower seal, and the pipette functions as a traditional air displacement pipette.

However, in at least part of a blowout stroke portion, where the plunger is moved between the home position and the fixed lower stop, the relatively narrow distal segment is decoupled from the lower seal, and air is displaced by a relatively wide proximal segment of the piston as it moves through an upper seal. The wider segment of the piston increases the volume of air displaced by the piston per unit of axial movement, and accordingly, increases the velocity and volume of the air moving through and out of the tip if the plunger unit is moved at the same speed. This increased air volume and velocity tends to improve the ability of the blowout stroke to discharge liquid that may be adhering to the tip following the dispensing stroke.

Accordingly, a number of shortcomings of other known manual air displacement pipettes are remedied by pipettes according to the invention. The invention may also be adapted to electronic air displacement pipettes, either as a substitute for or in addition to motor-based enhanced blowout strategies (such as a longer or accelerated blowout stroke).

BRIEF DESCRIPTION OF THE DRAWINGS

These and other objects, features, and advantages of the invention will become apparent from the detailed description below and the accompanying drawings, in which:

FIG. 9 is a schematic illustration of a stepped piston and dual moving seal configuration to increase the velocity of air and liquid discharged during a blowout stroke of an air displacement pipette, with the piston at an upper stop position;

FIG. 10 is a is a is a schematic illustration of a stepped piston and dual moving seal configuration to increase the velocity of air and liquid discharged during a blowout stroke of an air displacement pipette, with the piston at a home position;

FIG. 11 is a schematic illustration of a stepped piston and dual moving seal configuration to increase the velocity of air and liquid discharged during a blowout stroke of an air displacement pipette, with the piston at a lower stop position;

FIG. 12 is a cutaway diagram of an air displacement pipette employing a stepped piston and dual seal configuration according to the invention arranged to increase the velocity of air and liquid discharged during a blowout stroke, with the piston at an uppermost position against a volume-setting stop; and FIG. 13 is a cutaway diagram of an air displacement pipette employing a stepped piston and dual seal configuration according to the invention arranged to increase the velocity of air and liquid discharged during a blowout stroke, with the piston at an uppermost position against a volume-setting stop.

DETAILED DESCRIPTION OF THE INVENTION

The invention is described below, with reference to detailed illustrative embodiments. It will be apparent that a system according to the invention may be embodied in a wide variety of forms. Consequently, the specific structural and functional details disclosed herein are representative and do not limit the scope of the invention.

Figure 1:
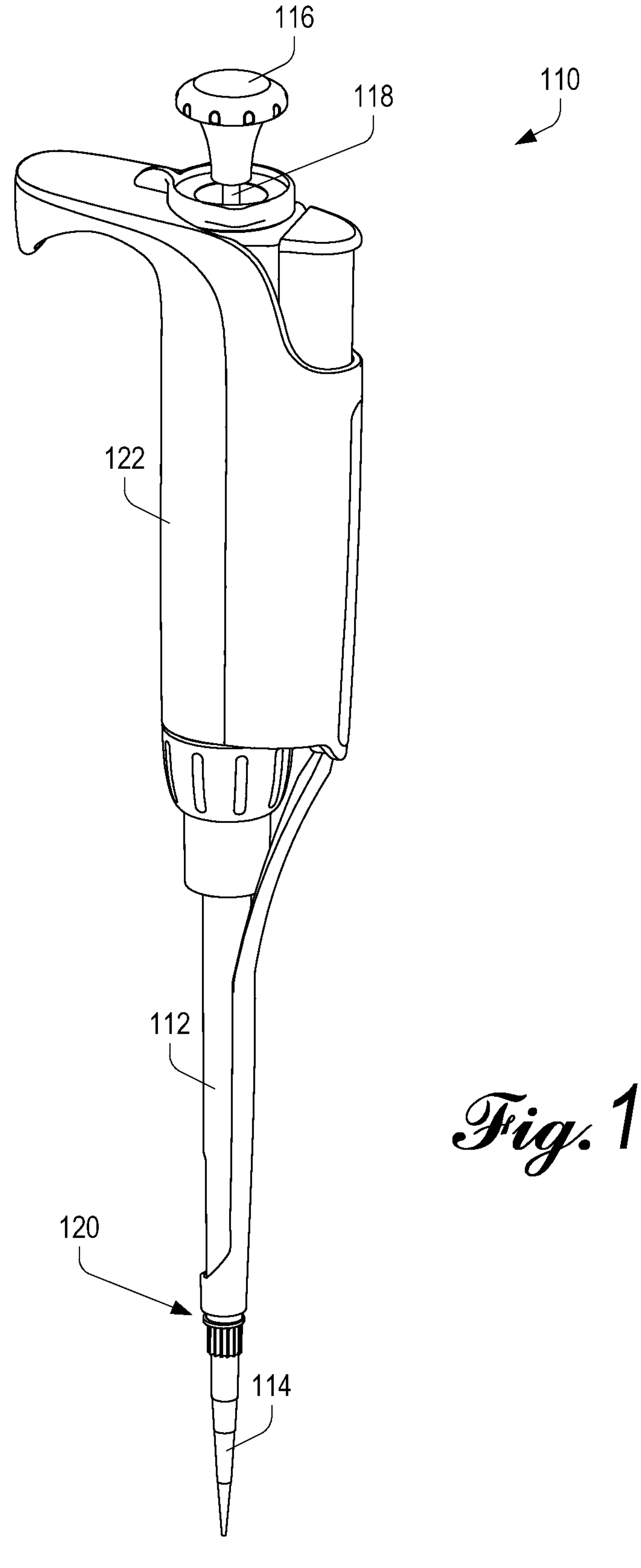
FIG. 1 represents a handheld pipette according to the invention employing enhanced blowout characteristics according to the invention.

Referring initially to FIG. 1, a handheld pipette 110 according to the invention is shown. As with traditional pipettes, the illustrated pipette 110 has a tip-mounting shaft 112, and a tip 114 is shown mounted on the shaft 112.

The overall form factor of the pipette 110 and its disposable tip 114 is comparable to that of traditional pipettes, and the combination is used in the same ways and using the same techniques as would be performed using traditional pipettes.

The pipette has a plunger button 116 connected to a plunger rod 118. The button 116 and rod 118 are spring-biased to a fully-extended position. The plunger rod 118 is coupled to a piston within the pipette 110 (not shown). And as with traditional pipettes, when the plunger button 116 is depressed, it moves the plunger rod 118 and the piston downward through the shaft 112 toward a nozzle at a distal end 120 of the shaft 112, from its uppermost position against an upper volume-setting stop.

As in traditional manual pipettes, the plunger button 116 is spring-biased relative to two positions, namely a released and extended position and a home position. There is a fully-depressed blowout position when the plunger button 116 is depressed past the home position. With no pressure applied to the plunger button 116, a plunger spring biases the plunger button 116 upward against an upper volume-setting stop, the position of which is adjusted by turning the plunger button 116 and a stop position adjustment mechanism as discussed above. Some pipettes, including the pipette 110 illustrated in FIG. 1, include a user-controlled volume lock 124 to prevent undesired volume adjustments. In this position, the plunger rod 118 and plunger button 116 are at the released and extended position with respect to the body 122 of the pipette 110.

At the home position, with the plunger button 116 partially depressed, the resistance to depression of the plunger button increases. As is common in handheld pipette construction, a secondary pre-loaded blowout spring adds to the resistance offered by the plunger spring. The increased resistance is sensed by the pipette user and defines the home position. Between the released and extended position and the home position, only the plunger spring biases the plunger button position upward toward its extended position, and a relatively light first force level is required to act against the spring bias.

The plunger button 116 is released from the home position to the fully extended position to aspirate a desired volume of liquid, and subsequently moved from the extended position to the home position, and onward to the lower stop to dispense the liquid.

Between the home position and a fully-depressed blowout position, both the plunger spring and the blowout spring act upward against the plunger button 116, and a higher second force level is required to act against the spring bias. This configuration including a primary plunger spring and a secondary blowout spring is common in handheld pipettes.

After dispensing, the plunger button 116 is moved from the home position through to the end of the blowout position to eject any remaining liquid from the pipette tip 114.

Accordingly, at the home position, the user feels a tactile transition between the two spring forces, and by exerting a force between the first level and the higher second level, the user can easily keep the plunger button 116 at the home position.

In a traditional handheld pipette, the plunger button acts directly through the plunger rod to a cylindrical piston, which maintains an air-tight seal with the liquid end of the pipette via a seal within the pipette. The seal remains in a fixed position with respect to the liquid end and further forms an air-tight seal with respect to an interior portion of the liquid end. Accordingly, as the plunger button is manipulated, the piston is caused to move through the seal and displace an air volume within the liquid end. As an orifice is provided at a distal end of the pipette tip, and a substantially air-tight seal is maintained at all other places, the only path for a liquid (or any fluid) to enter or exit the tip is via the orifice, and there is a deterministic relationship between the volume of air displaced by the piston and the volume of liquid manipulated by the pipette.

In many regards, the pipette 110 may be configured similarly to a traditional handheld manual pipette. One exemplary pipette configuration that may be employed and reconfigured as set forth herein is described in U.S. Pat. No. 5,700,959 to Homberg, which is hereby incorporated by reference as though set forth in full. The same volume setting mechanisms, springs, drive mechanisms, plunger mechanisms, and body parts may generally be employed. The primary differences reasonably necessary for a pipette 110 according to the invention to function as described herein are a segmented, stepped piston and at least two piston seals as described below and with reference to FIGS. 5-7.

Figure 2:
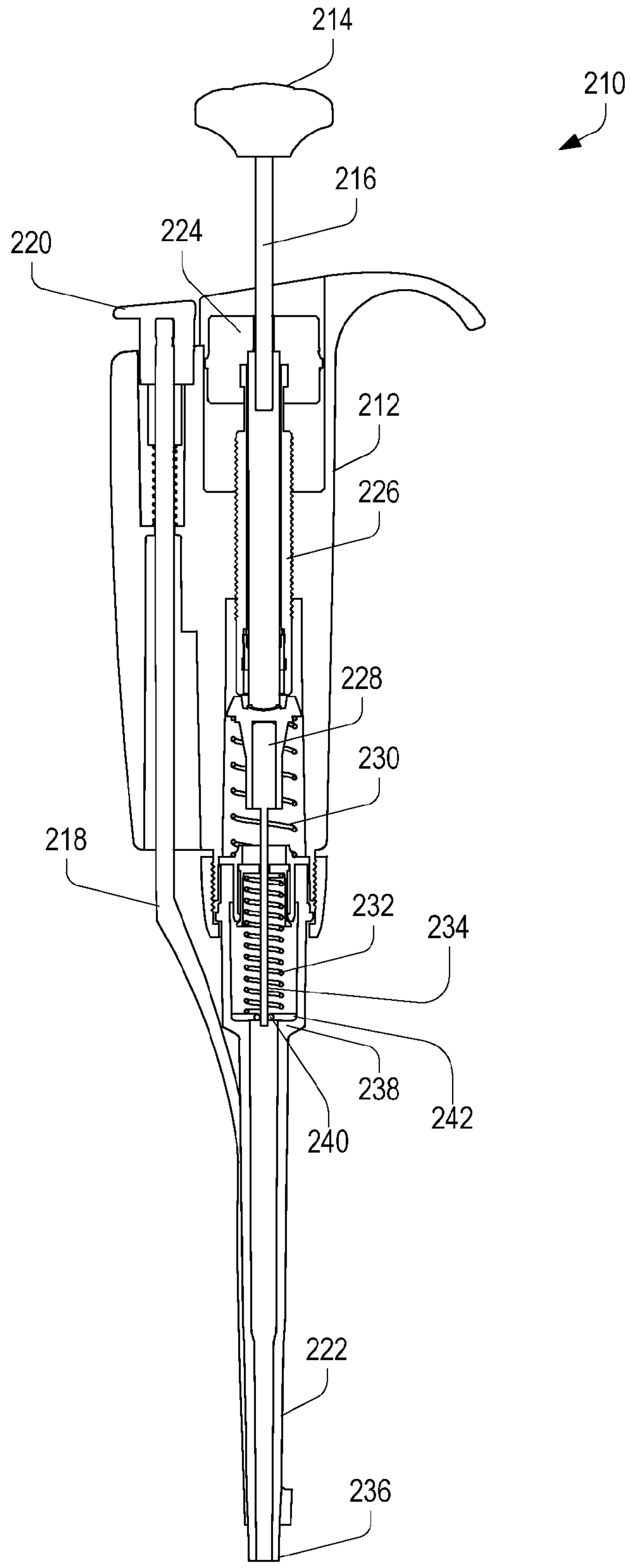
FIG. 2 is a cutaway diagram of a traditional air displacement pipette employing a cylindrical piston and a single seal according to the prior art.

By way of comparison, a traditional air displacement pipette is illustrated in FIG. 2. The illustrated pipette is a simplified representation of the RAININ CLASSIC pipette available from Rainin Instrument, LLC, although the present invention can just as easily be applied to various other types and configurations of handheld pipettes and other air displacement liquid handling devices.

Like the embodiment illustrated in FIG. 1, it includes a hand-holdable body 212, a plunger button 214 and a plunger rod 216 used to operate the pipette 210, a tip ejector 218 coupled to an ejector button 220, and a tip-mounting shaft 222. For simplicity of illustration, the embodiment of FIG. 2 has no volume lock mechanism.

The volume setting mechanism includes a volume knob 224 and a volume-setting screw 226, which adjusts the position of an upper stop in the pipette, thus limiting the pipette's stroke length. The plunger rod 216 acts against a piston assembly 228, which is spring-biased upward by a stroke spring 230 and a blowout spring 232, the latter of which begins further compression (past its initial pre-loaded state) only as the piston assembly 228 crosses a specified home position.

The piston assembly 228 includes a cylindrical piston 234 extending axially into the shaft 222; this piston 234 seals against an annular seal ring 240 that is kept in place within the shaft 222 by a seal retainer 242, which in turn is held in position against a step 238 in the shaft 222 by pressure applied from the blowout spring 232. The seal retainer and/or the seal ring 240 should also seal against the shaft 222, to avoid presenting a path for air leakage.

Accordingly, axial movement of the piston 234 through the seal ring 240 displaces air within the shaft 222; and as the shaft is otherwise entirely closed (and a tip is generally mounted and sealed thereto), there is no other path and air and liquid must enter and exit the tip through its distal open end.

Figure 3:
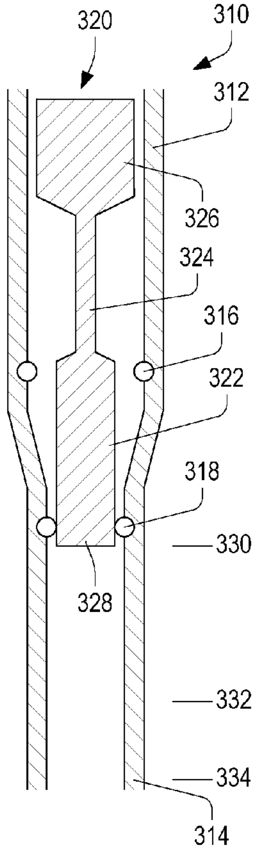
FIG. 3 is a schematic illustration of a stepped piston and dual stationary seal configuration to increase the velocity of air and liquid discharged during a blowout stroke of an air displacement pipette, with the piston at an upper stop position.
Figure 4:
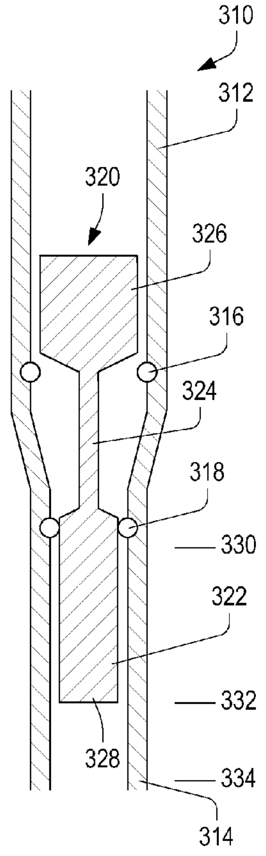
FIG. 4 is a is a is a schematic illustration of a stepped piston and dual stationary seal configuration to increase the velocity of air and liquid discharged during a blowout stroke of an air displacement pipette, with the piston at a home position.
Figure 5:
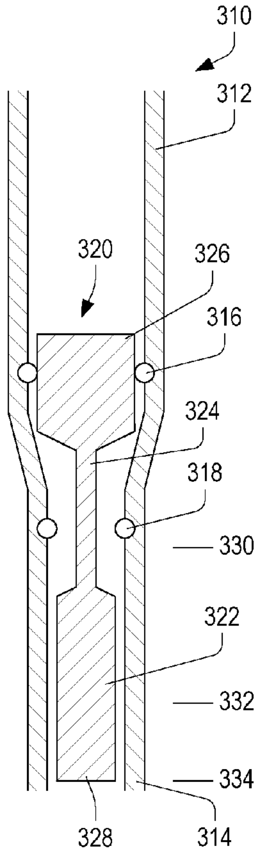
FIG. 5 is a schematic illustration of a stepped piston and dual stationary seal configuration to increase the velocity of air and liquid discharged during a blowout stroke of an air displacement pipette, with the piston at a lower stop position.

FIGS. 3, 4, and 5 illustrate, in schematic form, the operation of a segmented, stepped piston according to the invention in an embodiment that employs increased air volume and velocity to enhance the blowout stroke of a pipette.

FIG. 3 includes an exemplary pipette shaft 310, with a wide upper end 312 and a narrower lower end 314. Within the shaft 310 are an upper seal ring 316 and a lower seal ring 318, each shown in section. It should be noted that the seal rings 316 and 318 can be fixed in position within the shaft 310 via one or more seal retainers; such retainers are omitted from this schematic view for simplicity. The seals can also be fixed in place by supporting details directly within the shaft.

Also included in FIG. 3 is a segmented piston 320, including a relatively narrow lower segment 322, a thin waist segment 324, and a relatively wider upper segment 326. In the disclosed embodiment, the waist segment 324 is generally narrower in diameter than both the lower segment 322 and the upper segment 326. As will be discussed in further detail below, the waist segment 324 need not be narrower than the lower segment 322; it may be configured to pass air around the lower seal ring by means of a flat or groove in the piston, machined into or otherwise defined into the waist segment. No plunger rod is pictured, but in a real-world implementation it is understood that the piston 320 would be coupled to a plunger unit.

The lower segment 322 and the lower seal ring 318 are sized and configured so that a lower seal is formed between the piston 320 and the lower seal ring 318 when the lower segment 322 is positioned axially within the lower seal ring 318. Similarly, the upper segment 326 and the upper seal ring 316 are sized and configured so that an upper seal is formed between the piston 320 and the upper seal ring 316 when the upper segment 326 is positioned axially within the upper seal ring 316. These upper and lower seals will be described in further detail in connection with FIGS. 3-5.

In FIG. 3, the piston 320 is shown at its uppermost position 330, against an upper volume-setting stop. As pictured, the volume-setting stop is at or near its maximum volume setting. As shown here, a bottom end 328 of the piston 320 is barely within the lower seal ring 318, but still seals against it. As the piston 320 moves downward through the main (upper) stroke of the pipette, the lower segment 322 of the piston 320 moves through the lower seal ring 318, displacing a corresponding quantity of air. As in traditional pipettes, the volume of air displaced by the piston 320 as it moves from the upper stop (at a maximum volume setting) to the home position 332 is substantially equal to the maximum liquid volume capacity of the pipette. Continued movement toward a position corresponding to a fixed lower stop 334 exceeds that capacity, and represents the blowout stroke.

For example, in a pipette according to the invention having a 200 μl capacity the lower segment 322 of the piston may have a diameter of approximately 4 mm, and the distance between the upper stop and the home position may be about 16 mm. As the piston moves between the upper stop and home position, it then displaces 200 μl of air, which in turn moves an approximately equal amount of liquid in or out of the pipette tip. Similarly, in a pipette according to the invention having a 20 μl capacity, the lower segment 322 may have a diameter of approximately 1.25 mm.

It will be noted that in FIG. 3, the wider upper segment 326 of the piston 320 is not in sealing engagement with the upper seal ring 326, and accordingly, the upper segment 326 has no effect on the performance of the pipette between the upper stop and home position. A variable volume pipette set to a lower volume setting, near the lower end of its volume setting range, will engage with the seal rings in the same way as illustrated in FIG. 3, but the starting position of the piston 320 will be between the uppermost position 330 and the home position 332.

FIG. 4 shows the piston 320 (FIG. 3) at the home position 332. In this position, the lower segment 322 of the piston 320 is still sealing against the lower seal ring 318, but only just so, and the upper segment 326 of the piston 320 is close to but not yet in sealing engagement with the upper seal ring 316. At this point, the pipette is still essentially performing as a traditional air displacement pipette. However, as the piston 320 continues to move axially downward into the blowout stroke, the lower segment 322 breaks its seal with the lower seal ring, the upper segment 326 engages the upper seal ring 316, and continuing air displacement is accomplished by the movement of the wider upper segment 326 moving through its upper seal ring 316. Because this segment of the piston 320 is wider, each unit of vertical axial movement of the piston 320 displaces more air. If the piston continues to move at a constant velocity, the air it displaces will move more quickly through the constricted, narrow end of the pipette tip 114. This faster-moving higher volume air is more effective in removing droplets and adhering films of liquid from a pipette tip in a pipette according to the invention.

As shown in FIG. 5, the piston 320 (FIG. 3) is at the position 334 corresponding to the lower stop, and has completed its blowout stroke. The upper segment 326 of the piston has moved through the upper seal ring 316 and the upper seal remains in place, and the lower segment 322 remains disengaged from the lower seal ring 318. The waist segment 324 need not be considerably narrower than the lower segment 322; it is sufficient for at least a portion of it to be narrow enough that the lower seal ring 318 disengages and allows air to flow freely between the lower seal ring 318 and the waist segment 324 of the piston 320. The waist segment 324 need not be cylindrical; in an embodiment of the invention the waist segment 324 is nearly cylindrical with a diameter equal to that of the lower segment, but with one or more axial machined air paths defined by its outer surface. Other configurations are possible and can be readily imagined, including pistons that include internal air paths.

As noted above, the embodiment schematically illustrated in FIGS. 3-5 accomplishes enhanced blowout by increasing the volume and velocity of air discharged through a pipette tip during a blowout portion of a pipetting stroke. In an alternative embodiment, illustrated in FIGS. 6-8, enhanced blowout is accomplished by accumulating pressure in a void defined within the body between the two seal rings, and abruptly releasing the pressurized air through the pipette tip in a rush.

Figure 6:
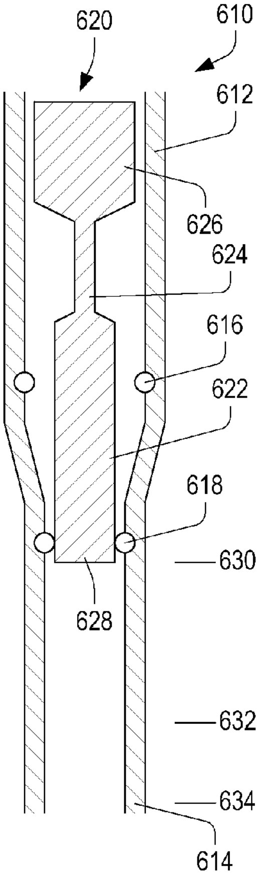
FIG. 6 is a schematic illustration of a stepped piston and dual stationary seal configuration to increase the pressure of air discharged during a blowout stroke of an air displacement pipette, with the piston at an upper stop position.

Like FIG. 3, FIG. 6 includes an exemplary pipette shaft 610, with a wide upper end 612 and a narrower lower end 614. Within the shaft 610 are an upper seal ring 616 and a lower seal ring 618, each shown in section. The seal rings 616 and 618 can be fixed in position within the shaft 610 via one or more seal retainers; such retainers are once again omitted from this schematic view for simplicity.

Also included in FIG. 6 is a segmented piston 620, including a relatively narrow lower segment 622, a thin waist segment 624, and a relatively wider upper segment 626. In the disclosed embodiment, the waist segment 624 is narrower in diameter than both the lower segment 622 and the upper segment 626. No plunger rod is pictured.

As in the embodiment pictured in FIGS. 3-5, the lower segment 622 and the lower seal ring 618 are sized and configured so that a lower seal is formed between the piston 620 and the lower seal ring 618 when the lower segment 622 is positioned axially within the lower seal ring 618. Similarly, the upper segment 626 and the upper seal ring 616 are sized and configured so that an upper seal is formed between the piston 620 and the upper seal ring 616 when the upper segment 626 is positioned axially within the upper seal ring 616. These upper and lower seals and their relationship with the piston 612 will be described in further detail in connection with FIGS. 6-8.

In FIG. 6, the piston 620 is shown at its uppermost position 630, against an upper volume-setting stop at or near its maximum volume setting. As shown here, a bottom end 628 of the piston 620 is barely within the lower seal ring 618, but still seals against it. As the piston 620 moves downward, the lower segment 622 of the piston 620 moves through the lower seal ring 618, displacing a corresponding quantity of air. As in traditional pipettes, the volume of air displaced by the piston 620 as it moves from the upper stop (at a maximum volume setting) to the home position 632 is substantially equal to the maximum liquid volume capacity of the pipette. Continued movement toward a position corresponding to a fixed lower stop 634 exceeds that capacity, and represents the blowout stroke.

In a pipette according to the invention having a 200 μL capacity, as the piston moves between the upper stop and home position, it then displaces 200 μl of air, which in turn moves an approximately equal amount of liquid in or out of the pipette tip.

In FIG. 6, the wider upper segment 626 of the piston 620 is not in sealing engagement with the upper seal ring 616, and accordingly, the upper segment 626 has no effect on the performance of the pipette between the upper stop and home position. A variable volume pipette set to a lower volume setting, near the lower end of its volume setting range, will engage with the seal rings in the same way as illustrated in FIG. 6 but the starting position of the piston 620 will be between the uppermost position 630 and the home position 632.

Figure 7:
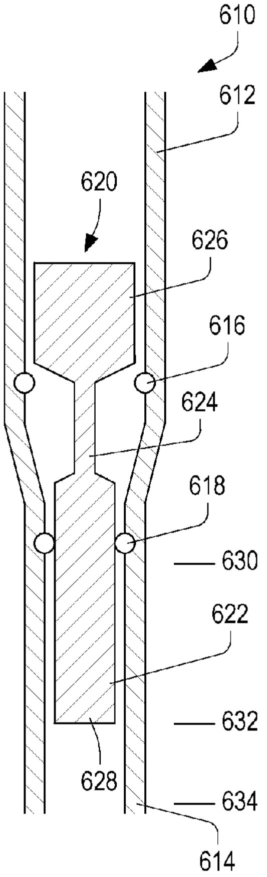
FIG. 7 is a schematic illustration of a stepped piston and dual stationary seal configuration to increase the pressure of air discharged during a blowout stroke of an air displacement pipette, with the piston at a home position.
Figure 8:
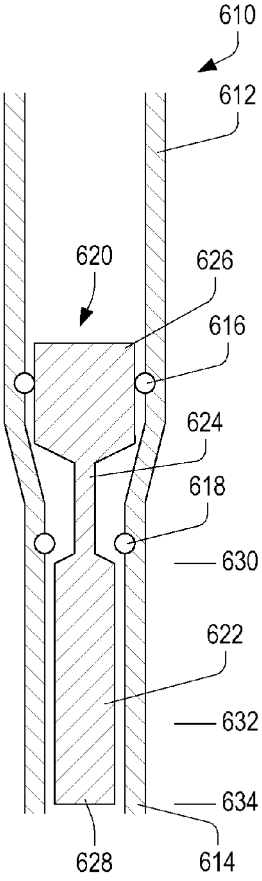
FIG. 8 is a schematic illustration of a stepped piston and dual stationary seal configuration to increase the pressure of air discharged during a blowout stroke of an air displacement pipette, with the piston at a lower stop position.

It will be noted that the piston 620 of FIGS. 6-8 is different in at least two key aspects from the piston 320 of FIGS. 3-5: the waist segment 624 (FIG. 6) is shorter in axial length than the corresponding waist segment 324 (FIG. 3), and the lower segment 622 (FIG. 6) is longer in axial length than the corresponding lower segment 322 (FIG. 3). These interrelated changes allow pressure to build up within and be discharged from the pipette 110 during the blowout stroke of the embodiment of FIGS. 6-8, as will be described in further detail below.

FIG. 7 shows the piston 620 (FIG. 6) at the home position 632. In this position of the illustrated embodiment, the lower segment 622 of the piston 620 continues to seal against the lower seal ring 618, and the upper segment 626 of the piston 320 is about to but has not yet begun to come into sealing engagement with the upper seal ring 616. At this point, the pipette is still essentially performing as a traditional air displacement pipette. However, as the piston 620 continues to move axially downward into the blowout stroke, the lower segment 622 continues to seal with the lower seal ring, the upper segment 626 engages and seals against the upper seal ring 616, and continued axial downward movement of the upper segment 626 begins to compress air in a sealed region 712 between the two seal rings 616 and 618.

The compression of the air in the sealed region 712 continues until the piston 620 approaches the end of the blowout stroke as illustrated in FIG. 8. At that point, the seal between the lower segment 622 of the piston 620 and the lower seal ring 618 breaks, allowing the compressed air to escape from the region 712, between the waist segment 624 and the lower seal ring 618, and out of the pipette and its coupled tip 114. This escape of compressed air manifests as a transient high-velocity stream of air from the tip, which tends to dislodge any droplets or films of adhering liquid.

As shown in FIG. 8, the piston 620 (FIG. 6) is at the position 634 corresponding to the lower stop, and has completed its blowout stroke. The upper segment 626 of the piston has moved through the upper seal ring 616, and the upper seal remains in place. The lower segment 622 has just become, and remains, disengaged from the lower seal ring 618. As with the embodiment of FIGS. 3-5, the waist segment 624 need not be cylindrical or significantly narrower than the lower segment 622; in an embodiment of the invention the waist segment 624 is nearly cylindrical with a diameter equal to that of the lower segment, but with one or more axial machined air paths defined by the its outer surface. Other configurations are possible and can be readily imagined.

An alternative embodiment of a pipette according to the invention employs a segmented piston employing a plurality of moving seals against substantially cylindrical inner surfaces of the pipette body, shaft, or a cylinder module. FIGS. 9, 10, and 11 illustrate, in schematic form, the operation of such a segmented, stepped piston with moving seals according to the invention, in an embodiment that (like FIGS. 3-5) employs increased air volume and velocity to enhance the blowout stroke of a pipette.

FIG. 9 includes an exemplary pipette shaft 910, with a wide upper end 912 and a narrower lower end 914. Within the shaft 910 are a substantially cylindrical upper chamber 916 and a substantially cylindrical lower chamber 918, each shown in section. The upper chamber 916 has a diameter greater than a diameter of the lower chamber 918. The upper chamber 916 and the lower chamber 918 are adjacent to each other, and may be defined directly by the shaft or the body of the pipette, either through molding or machining, or may alternatively take the form of a modular cylinder structure constructed separately and held in place within the pipette body or shaft. The lower chamber 918 is in communication with a lower end of the pipette shaft and the pipette tip 114 (FIG. 1), and the upper chamber 916 is in communication with the body of the pipette or the external environment.

FIG. 9 also includes an upper groove 920 (or plurality of upper grooves) defined by an inner wall of the upper chamber 916 and a lower groove 922 (or plurality of lower grooves) defined by an inner wall of the lower chamber 918, the functions of which will be described in further detail below.

Also included in FIG. 9 is a segmented piston 924 carrying two moving seal rings, an upper seal ring 926 and a lower seal ring 928. The upper seal ring 926 is sized and configured to seal against the inner wall of the upper chamber 916 (except where the upper groove 920 is present), and the lower seal ring 928 is sized and configured to seal against the inner wall of the lower chamber 918 (except where the lower groove 922 is present). Either a dry seal or a lubricated seal may be employed. When the upper seal ring 926 is positioned against the upper groove 920, air within the pipette is able to bypass the upper seal ring 926. Similarly, when the lower seal ring 928 is positioned against the lower groove 922, air is able to bypass the lower seal ring 928. As with FIGS. 3-5, no plunger rod is pictured, but in a real-world implementation it is understood that the piston 924 would be coupled to a plunger unit.

In FIG. 9, the piston 924 is shown at its uppermost position 930, against an upper volume-setting stop at or near its maximum volume setting. As shown here, the lower seal ring 928 of the piston 924 is axially positioned near a top portion of the lower chamber 918, but still seals against the inner surface of the lower chamber 918. As the piston 924 moves downward through the main (upper) stroke of the pipette, the lower seal ring 928 of the piston 924 traverses the length of the lower chamber 918, displacing a corresponding quantity of air. As in traditional pipettes, the volume of air displaced by the piston 924 as it moves from the upper stop (at a maximum volume setting) to the home position 932 is substantially equal to the maximum liquid volume capacity of the pipette. Continued movement toward a position corresponding to a fixed lower stop 934 exceeds that capacity, and represents the blowout stroke.

Volumes are calculated in a manner similar to that of the embodiment of FIGS. 3-5. For example, in a pipette according to the invention having a 200 μl capacity the lower seal ring 928 of the piston 924 may have a diameter of approximately 4 mm, and the distance between the upper stop and the home position may be about 16 mm. As the piston moves between the upper stop and home position, it then displaces 200 μl of air, which in turn moves an approximately equal amount of liquid in or out of the pipette tip. Similarly, in a pipette according to the invention having a 20 μl capacity, the lower seal ring 928 may have a diameter of approximately 1.25 mm.

It will be noted that in FIG. 9, the wider upper seal ring 926 of the piston 924 is adjacent to the upper groove 920, and hence is not in sealing engagement with the upper chamber 916. Accordingly, the upper seal ring 926 has no effect on the performance of the pipette as the piston 924 moves between the upper stop position 930 and home position 932—the upper seal ring 926 remains unsealed for that entire portion of a pipetting stroke. A variable volume pipette set to a lower volume setting, near the lower end of its volume setting range, will seal in the same way as illustrated in FIG. 9, but the starting position of the piston 924 will be between the uppermost position 930 and the home position 932.

FIG. 10 shows the piston 924 (FIG. 9) at the home position 932. In this position, the lower seal ring 928 of the piston 924 is still sealing against the lower chamber 918, but only just so (since further downward axial motion would bring the lower seal ring 928 against the lower groove 922), and the upper seal ring 926 of the piston 924 is about to come into full sealing engagement with the upper chamber 916. At this point, the pipette is still essentially performing as a traditional air displacement pipette. However, as the piston 924 continues to move axially downward into the blowout stroke, the lower seal ring 928 breaks its seal with the lower chamber 918, and continuing air displacement is accomplished by the movement of the wider upper seal ring 926 moving through and sealing against the upper chamber 916. Because this upper segment of the piston 924 is wider, each unit of vertical axial movement of the piston 924 displaces more air. If the piston continues to move at a constant velocity, the air it displaces will move more quickly through the constricted, narrow end of the pipette tip 114 (FIG. 1). This faster-moving higher volume air is more effective in removing droplets and adhering films of liquid from a pipette tip in a pipette according to the invention.

As shown in FIG. 11, the piston 924 (FIG. 9) is at the position 934 corresponding to the lower stop, and has completed its blowout stroke. The upper seal ring 926 of the piston 924 has moved axially downward through the upper chamber 916 and the upper seal remains in place, and the lower seal ring 928 remains disengaged from the lower chamber 918 by way of the lower groove 922.

One possible alternative embodiment of a pipette as illustrated schematically in FIGS. 9-11 involves replacing the upper groove 920 with one or more through-holes defined by the shaft 910 (or cylinder module) and in communication with the external environment, at a position corresponding to a lower end of the illustrated upper groove 920. In this alternative configuration, axial movement of the upper seal ring 926 within the upper chamber 916 above the through-hole has no effect on the operation of the pipette, not because the upper seal ring 926 is bypassed, but rather because the moving seal displaces air out of the through-hole during the main (upper) stroke of the pipette. As the upper seal ring 926 moves downward past the through-hole, during the blowout stroke, the upper seal ring 926 displaces air around the (bypassed) lower seal ring 928 instead, as illustrated in FIGS. 10-11. Other configurations with similar performance are possible and can be readily imagined.

It will be noted that another alternative embodiment of the implementation of FIGS. 9-11 is possible, in which pressure builds between the moving seal rings 926 and 928 (analogous to the embodiment of FIGS. 6-8) before being discharged during the blowout stroke. This alternative embodiment may be accomplished by minor changes to the configuration shown in FIGS. 9-11, easily implemented by a person of ordinary skill, and accordingly, it is not illustrated or described in detail.

It will be recognized that the configurations illustrated in FIGS. 3-11 are entirely schematic in nature, and accordingly, dimensions and relationships are exaggerated for purposes of clarity. An actual pipette according to the invention will have significantly different dimensions, which may be derived from the description hereof, particularly with reference to FIGS. 12-13 as described below, and from the knowledge of traditional pipettes and design considerations that would be in possession of a practitioner of ordinary skill. It should also be noted that various other changes are possible, including an embodiment where the upper segment of the shaft 326, 626 or the upper moving seal ring 926 never unseals. Air displaced by that segment or seal would be otherwise prevented from affecting the performance of the pipette during the main stroke, for example by routing its displaced air through a check valve or some other mechanism or structure during the main stroke. Various other deviations and alterations are possible, and are all intended to remain within the scope of the present invention.

The embodiment illustrated schematically in FIGS. 3-5 is shown in relation to an exemplary cutaway pipette in FIG. 12. As with the prior art pipette shown in FIG. 2, a simplified version of the RAININ CLASSIC pipette is illustrated here to most clearly describe how the invention is incorporated into a handheld manual air displacement pipette; other implementations in other pipetting contexts—such as multichannel handheld pipettes, or benchtop multichannel pipettes, or robotic devices—can easily be derived from this disclosure.

Like the prior art pipette illustrated in FIG. 2, it includes a hand-holdable body 1212, a plunger button 1214 and a plunger rod 1216 used to operate the pipette 1210, a tip ejector 1218 coupled to an ejector button 1220, and a tip-mounting shaft 1222.

The volume setting mechanism, including a volume knob 1224 and a volume-setting screw 1226 is comparable to the mechanism present in a traditional pipette. The plunger rod 1216 acts against a piston assembly 1228, which is spring-biased upward by a stroke spring 1230 and a blowout spring 1232, the latter of which is installed in a pre-loaded state, and compressed further only as the piston assembly 1228 crosses a specified home position.

The piston assembly 1228 of FIG. 12 is segmented, as conceptually shown in FIGS. 3-5. The piston assembly 1228 includes a relatively narrow lower segment 1240, a thin waist segment 1242, and a relatively wider upper segment 1244. In the disclosed embodiment, the waist segment 1242 is narrower in diameter than both the lower segment 1240 and the upper segment 1244.

In the disclosed embodiment, the piston assembly 1228 is manufactured as a single machined and polished piece of a suitable metal such as stainless steel. Other materials may also be suitable for this purpose, such as machined ceramics or molded polymers like polyetheretherketone (PEEK). If desired, the piston assembly 1228 can also be assembled from multiple parts and materials. The piston assembly 1228 is coupled to the plunger rod 1216 by a tight friction fit, although in alternative embodiments the piston assembly 1228 and plunger rod 1216 may be affixed together by a screw joint, adhesives, or may even be machined as a single unitary component.

The shaft 1222 includes a lower seal ring 1246 and an upper seal ring 1248 held in place by a seal retainer 1250; the retainer drops into place within the shaft 1222 and is held in position by pressure from the blowout spring 1232. As illustrated, the lower seal ring 1246 further seals against the shaft 1222, thereby preventing air above the retainer 1250 from undesirably leaking through a path between the retainer 1250 and the shaft 1222.

As in FIGS. 3-5, the lower segment 1240 of the piston assembly 1228 and the lower seal ring 1246 are sized and configured so that a lower seal is formed between the piston assembly 1228 and the lower seal ring 1246 when the lower segment 1240 is positioned axially within the lower seal ring 1246. Similarly, the upper segment 1244 and the upper seal ring 1248 are sized and configured so that an upper seal is formed between the piston assembly 1228 and the upper seal ring 1248 when the upper segment 1244 is positioned axially within the upper seal ring 1248. As the piston assembly 1228 is moved axially under control of the user through the plunger rod 1216, the pipette 1210 operates as illustrated in the schematic illustrations of FIGS. 3-5.

As described above in connection with the prior art pipette of FIG. 2, the seal rings 1246 and 1248 may be formed from any suitable material, and may take the form of a compressed o-ring, a lip seal, or a skirted seal; it may be a dry seal or a wet seal as performance requirements dictate. These are routine design decisions that are well within the realm of a practitioner of ordinary skill in the art of pipette design. In a pipette according to the invention, the seals should be designed and manufactured with sufficient durability to avoid degrading over an acceptable service interval for the pipette; unlike traditional pipettes with cylindrical pistons and a single seal, a piston assembly 1228 according to the invention moves axially into and out of both the lower seal ring 1246 and the upper seal ring 1248 during operation, which may tend to increase seal wear. Accordingly, the piston assembly 1228 may be provided with chamfers or rounded edges at the segment transitions to reduce abrasion and damage.

In the disclosed embodiment, which roughly represents a pipette having a maximum 200 μl liquid capacity (for simplicity and clarity of illustration), the piston assembly 1228 may have advantageous dimensions as follows: the lower segment 1240 has a diameter of approximately 4 mm; the waist segment 1242 has a diameter of approximately 2-3 mm; the upper segment 1244 has a diameter of approximately 8 mm. The pipette 1210 has a main stroke length of approximately 16 mm and a blowout stroke length of about 5 mm; together, this total length of 21 mm begins to approach the longest reasonably comfortable stroke length controllable by a thumb-operated plunger button.

With these dimensions, the lower segment 1240 of a pipette 1210 according to the invention, traversing over the 16 mm main stroke, length displaces up to 200 μl of measured capacity, and during a 5 mm blowout stroke, approximately 250 μl of additional air is discharged via displacement from the upper segment 1244. In comparison, a traditional pipette would discharge only 62.5 μl of air during a blowout stroke of equal length (and equal duration), which—being less air, delivered at a slower velocity—will not be as effective at dislodging any remaining liquid in and on the tip. The disclosed pipette 1210 with the dimensions set forth above provides four times as much air during the blowout stroke. However, it will be noted that the diameters of the waist segment 1242 and the upper segment 1244 may be varied, and the additional air provided during the blowout stroke may accordingly be configured according to desired performance parameters.

Similarly, in a pipette according to the invention having a 20 μl capacity, with a 16 mm main stroke and a 5 mm blowout stroke, and with a piston having a lower segment diameter of about 1.25 mm and an upper segment diameter of about 2.5 mm, the blowout stroke would rapidly expel about 25 μl of air, as compared to slightly more than 6 μl for a traditional pipette having the same capacity and stroke lengths.

Of course, air displacement pipettes having different capacities (e.g. as low as 2 μl, and up to 5 μl or more) are readily commercially available, and a practitioner of ordinary skill in the art of mechanical design would be able to adapt the dimensions of the disclosed pipette to suit different pipettes of different capacities. The embodiments described herein are merely exemplary. The invention is believed to be particularly advantageous in connection with lower-volume air displacement pipettes, 200 μl or smaller, and especially 50 μl or smaller, as the portion of liquid that may adhere to the tip is greater in smaller volumes, relative to the total volume of liquid transferred.

The pipette of FIG. 12 illustrates the piston configuration shown schematically in FIG. 3. By depressing the plunger button 1214, the piston assembly 1228 will move axially through the seals 1246 and 1248 as shown in FIGS. 4-5. The pipette 1210 of FIG. 12 is not illustrated in those positions, which will be readily understood by a person of ordinary skill in the art through an understanding of traditional pipette operations in combination with the illustrations of FIGS. 3-5.

The embodiment illustrated schematically in FIGS. 9-11 is shown in relation to an exemplary cutaway pipette in FIG. 13. As with the prior art pipette shown in FIG. 2 and the stationary seal embodiment of FIG. 12, a simplified version of the RAININ CLASSIC pipette is illustrated in FIG. 13 to most clearly describe how the invention is incorporated into a handheld manual air displacement pipette; other implementations in other pipetting contexts—such as multichannel handheld pipettes, or benchtop multichannel pipettes, or robotic devices—can easily be derived from this disclosure.

The pipette of FIG. 13 includes a hand-holdable body 1312, a plunger button 1314 and a plunger rod 1316 used to operate the pipette 1310, a tip ejector 1318 coupled to an ejector button 1320, and a tip-mounting shaft 1322.

The volume setting mechanism, including a volume knob 1324 and a volume-setting screw 1326 is comparable to the mechanism present in a traditional pipette. The plunger rod 1316 acts against a piston assembly 1328, which is spring-biased upward by a stroke spring 1330 and a blowout spring 1332, the latter of which is installed in a preloaded state, and compressed further only as the piston assembly 1328 crosses a specified home position.

The piston assembly 1328 of FIG. 13 is segmented, as conceptually shown in FIGS. 9-11. The piston assembly 1328 includes a rigid central core 1340, with a relatively narrow lower seal ring 1342 and a relatively wider upper seal ring 1344. In the disclosed embodiment, the core 1340 of the piston is molded from a relatively rigid polymer such as polyetherimide (PEI), while the seal rings 1342 and 1344 are lip seals molded from a more compliant material such as ethylene propylene diene monomer (EPDM) rubber, advantageously lubricated with a suitable perfluoropolyether (PFPE) or other grease. The seal rings 1342 and 1344 may be formed from any suitable material, and may take the form of a compressed o-ring, a lip seal, or a skirted seal; it may be a dry seal or a wet seal as performance requirements dictate. The materials and assembly methods may be similar to those used in the pistons and cylinders described in U.S. patent application Ser. No. 13/742,305 to Moriarty et al, entitled "LIQUID END ASSEMBLY FOR A MULTICHANNEL AIR DISPLACEMENT PIPETTE" and filed on Jan. 15, 2013, which is hereby incorporated by reference as though set forth in full. Although that application discloses a multichannel handheld pipette, various aspects of the pistons and cylinders disclosed therein may be employed in a pipette as disclosed herein, whether it includes a single channel or multiple channels, and whether it is handheld or mounted, and whether it is manually operated or automatically driven. Other configurations are possible and would be easily realized by a person of ordinary skill. In an embodiment of the invention, the piston assembly 1328 is coupled to the plunger rod 1316 by a tight friction fit, although in alternative embodiments the piston core 1340 and plunger rod 1316 may be affixed together by a screw joint, adhesives, or may even be machined or molded as a single unitary component. These are routine design decisions that are well within the realm of a practitioner of ordinary skill in the art of pipette design.

The shaft 1322, as illustrated, defines a lower chamber 1346 and an upper chamber 1348; as noted above with reference to FIGS. 9-11, the chambers 1346 and 1348 may be defined by the shaft, or in alternative embodiments by the body, or formed as a separate module that fits within the shaft or body. However manufactured, the chambers 1346 and 1348 are preferably manufactured from a relatively rigid polymer capable of holding a smooth inner surface.

As in FIGS. 9-11, the lower seal ring 1342 of the piston assembly 1328 and the lower chamber 1346 are sized and configured so that a lower seal is formed between the lower seal ring 1342 and an inner surface of the lower chamber 1346 when the lower seal ring is positioned axially at a portion of the lower chamber 1346 that does not define a lower groove 1350. Similarly, the upper seal ring 1344 and the upper chamber 1348 are sized and configured so that an upper seal is formed between the upper seal ring and an inner surface of the upper chamber 1348 when the upper segment 1344 is positioned axially at a portion of the upper chamber 1348 that does not define an upper groove 1352. As the piston assembly 1328 is moved axially under control of the user through the plunger rod 1316, the pipette 1310 operates as illustrated in the schematic illustrations of FIGS. 9-11.

As with other embodiments of the present invention, the seal rings 1342 and 1344 and the chambers 1346 and 1348 should be designed and manufactured with sufficient durability to avoid degrading over an acceptable service interval for the pipette; unlike traditional pipettes with cylindrical pistons and a single seal, the seal rings 1342 and 1344 regularly traverse over the grooves 1350 and 1352 in the lower and upper chambers 1346 and 1348, respectively, which may tend to increase seal wear. Accordingly, the grooves 1350 and 1352 in the chambers 1346 and 1348 may be provided with chamfers or rounded edges to reduce abrasion and damage.

In the disclosed embodiment, which once again roughly represents a pipette having a maximum 200 μl liquid capacity (for simplicity and clarity of illustration), the piston assembly 1328 and chambers 1346 and 1348 may have advantageous dimensions as follows: the lower seal ring 1342 has a diameter of approximately 4 mm and the upper seal ring 1344 has a diameter of approximately 8 mm. The pipette 1310 has a main stroke length of approximately 16 mm and a blowout stroke length of about 5 mm; together, this total length of 21 mm begins to approach the longest reasonably comfortable stroke length controllable by a thumb-operated plunger button.

With these dimensions, the lower seal ring 1342 of a pipette 1310 according to the invention, traversing over the 16 mm main stroke, length displaces up to 200 μl of measured capacity, and during a 5 mm blowout stroke, approximately 250 μl of additional air is discharged via displacement from the upper seal ring 1344, bypassing the lower seal ring 1342 via the lower groove 1350. The diameter of the upper seal ring 1344 may be varied, and the additional air provided during the blowout stroke may accordingly be configured according to desired performance parameters.

Similarly, in a pipette according to the invention having a 20 μl capacity, with a 16 mm main stroke and a 5 mm blowout stroke, and with a piston having a lower segment diameter of about 1.25 mm and an upper segment diameter of about 2.5 mm, the blowout stroke would rapidly expel about 25 μl of air, as with the embodiment pictured in FIG. 12. A practitioner of ordinary skill in the art of mechanical design would be able to adapt the dimensions of the disclosed pipette to suit different pipettes of different capacities. The embodiments described herein are merely exemplary.

The pipette of FIG. 13 illustrates the piston configuration shown schematically in FIG. 9. By depressing the plunger button 1314, the piston assembly 1328 and its seals 1342 and 1344 will move axially in their respective chambers 1346 and 1348 as shown in FIGS. 10-11. The pipette 1310 of FIG. 13 is not illustrated in those positions, which will be readily understood by a person of ordinary skill in the art through an understanding of traditional pipette operations in combination with the illustrations of FIGS. 9-11.

It should be observed that while the foregoing detailed description of various embodiments of the present invention is set forth in some detail, the invention is not limited to those details and a pipette with enhanced blowout characteristics made according to the invention can differ from the disclosed embodiments in numerous ways. In particular, it will be appreciated that embodiments of the present invention may be employed in many different fluid-handling applications. The terms “upper” and “lower” are used in various contexts herein, in both the written description and the claims, with reference to a standard traditional handheld pipette oriented vertically, with a distal opening at the lower end and a plunger button at an upper end; it should be recognized that those terms are used for purposes of clarity and convenience and should not be considered limiting with respect to pipettes or components thereof that may be positioned in different orientations. Although the invention is described and illustrated in the context of an adjustable-volume manual handheld pipette, it is equally applicable to other types of air displacement pipettes, including fixed-volume pipettes, electronic pipettes, and various types of benchtop and freestanding liquid handling installations. It should be noted that functional distinctions are made above for purposes of explanation and clarity; structural distinctions in a system or method according to the invention may not be drawn along the same boundaries. Hence, the appropriate scope hereof is deemed to be in accordance with the claims as set forth below.

What is claimed is:

1. An air displacement pipette for aspirating and dispensing a quantity of liquid comprising:
- a pipette body;
- a piston mounted for axial movement within the body away from an upper stop position through a home position and to a lower stop position; and
- a nozzle adapted to receive air into the pipette body and to expel air from the pipette body in response to the axial movement of the piston;
- wherein the piston comprises a plurality of segments including a first segment and a second segment, the first segment of the piston seals against the pipette during at least a part of a first stroke portion, and the second segment of the piston seals against the pipette during at least a part of a second stroke portion; and
- wherein a second quantity of air displaced by an axial movement of the piston during the second stroke portion is greater than a first quantity of air displaced by an equivalent axial movement of the piston during the first stroke portion.

2. The air displacement pipette of claim 1, wherein the first stroke portion comprises a main stroke from the upper stop position to the home position.

3. The air displacement pipette of claim 1, wherein the second stroke portion comprises a blowout stroke from the home position to the lower stop position.

4. The air displacement pipette of claim 1, wherein the nozzle is adapted to receive a pipette tip.

5. The air displacement pipette of claim 1, wherein the body includes a shaft, and the nozzle is situated at a distal end of the shaft.

6. The air displacement pipette of claim 1, wherein the first segment of the piston comprises a lower segment of the piston, and wherein the pipette further comprises a first stationary seal ring adapted to form a substantially air tight seal against the lower segment and the body of the pipette as the lower segment of the piston moves axially through the first seal ring.

7. The air displacement pipette of claim 6, wherein the second segment of the piston comprises an upper segment of the piston, and wherein the pipette further comprises a second stationary seal ring adapted to form a substantially air tight seal against the upper segment and the body of the pipette as the upper segment of the piston moves axially through the second seal ring.

8. The air displacement pipette of claim 7, wherein the lower segment is substantially cylindrical and has a lower segment diameter, the upper segment is substantially cylindrical and has an upper segment diameter, and the upper segment diameter is greater than the lower segment diameter.

9. The air displacement pipette of claim 8, wherein the piston further comprises a waist segment between the lower segment and the upper segment.

10. The air displacement pipette of claim 9, wherein the waist segment is configured to allow air to pass between the waist segment and the first seal ring as the waist segment of the piston moves axially through the first seal ring.

11. The air displacement pipette of claim 10, wherein the waist segment is substantially cylindrical and has a waist segment diameter smaller than the lower segment diameter.

12. The air displacement pipette of claim 8, wherein:
- the pipette is configured to enable the lower segment of the piston to seal against the first seal ring during the main stroke, thereby causing the axial movement of the lower segment of the piston through the first seal ring to displace air through the nozzle during the main stroke; and
- the pipette is further configured to enable the upper segment of the piston to seal against the second seal ring and to cause the lower segment of the piston to disengage from the first seal ring during at least a portion of the blowout stroke, thereby causing the axial movement of the upper segment of the piston through the second seal ring to displace air through the nozzle during the blowout stroke.

13. The air displacement pipette of claim 8, wherein:
- the pipette is configured to enable the lower segment of the piston to seal against the first seal ring during the main stroke, thereby causing the axial movement of the lower segment of the piston through the first seal ring to displace air through the nozzle during the main stroke; and
- the pipette is further configured to enable the upper segment of the piston to seal against the second seal ring during at least a portion of the blowout stroke, with the lower segment of the piston continuing to seal against the first seal ring during a first portion of the blowout stroke; and
- the pipette is further configured to cause the lower segment of the piston to disengage from the first seal ring during a second portion of the blowout stroke;
- wherein the axial movement of the upper segment of the piston through the second seal ring during the first portion of the blowout stroke causes a buildup of pressurized air in a void in the body around the piston between the first seal ring and the second seal ring; and wherein the pressurized air is released past the first seal ring and through the nozzle during the second portion of the blowout stroke.

14. The air displacement pipette of claim 1, wherein the pipette further comprises a lower chamber, and wherein the first segment of the piston comprises a lower seal ring adapted to form a substantially air tight seal against at least a portion of an inner surface of the lower chamber.

15. The air displacement pipette of claim 14, wherein the pipette further comprises an upper chamber, and wherein the second segment of the piston comprises an upper seal ring adapted to form a substantially air tight seal against a portion of an inner surface of the upper chamber.

16. The air displacement pipette of claim 15, wherein the lower chamber is substantially cylindrical and has a lower chamber diameter, the upper chamber is substantially cylindrical and has an upper chamber diameter, and the upper chamber diameter is greater than the lower chamber diameter.

17. The air displacement pipette of claim 16, wherein a portion of the inner surface of the lower chamber defines at least one lower groove, and a portion of the inner surface of the upper chamber defines at least one upper groove or through-hole.

18. The air displacement pipette of claim 17, wherein the lower groove is configured to allow air to pass between the lower seal ring and the inner surface of the lower chamber as the lower seal ring moves axially across the portion of the inner surface of the lower chamber that defines the lower groove.

19. The air displacement pipette of claim 18, wherein the upper groove or through-hole comprises an upper groove configured to allow air to pass between the upper seal ring and the inner surface of the upper chamber as the upper seal ring moves axially across the portion of the inner surface of the upper chamber that defines the upper groove.

20. The air displacement pipette of claim 18, wherein the upper groove or through-hole comprises an upper through-hole configured to allow air displaced by the axial movement of the upper seal ring to be passed therethrough as the upper seal ring moves axially across the portion of the inner surface of the upper chamber above the upper through-hole.

21. The air displacement pipette of claim 16, wherein:

the pipette is configured to enable the lower seal ring to seal against the lower chamber during the main stroke, thereby causing the axial movement of the lower seal ring through the lower chamber to displace air through the nozzle during the main stroke; and the pipette is further configured to enable the upper seal ring to seal against the upper chamber and to cause the lower seal ring to engage the lower groove and unseal from the lower chamber during at least a portion of the blowout stroke, thereby causing the axial movement of the upper seal ring through the upper chamber to displace air through the nozzle during the blowout stroke.

22. The air displacement pipette of claim 16, wherein:

the pipette is configured to enable the lower seal ring to seal against the lower chamber during the main stroke, thereby causing the axial movement of the lower seal ring through the lower chamber to displace air through the nozzle during the main stroke; and the pipette is further configured to enable the upper seal ring to seal against the upper chamber during at least a portion of the blowout stroke, with the lower seal ring continuing to seal against the first chamber during a first portion of the blowout stroke;

the pipette is further configured to cause the lower seal ring to engage the lower groove and unseal from the lower chamber during a second portion of the blowout stroke;

wherein the axial movement of the upper seal ring in the upper chamber during the first portion of the blowout stroke causes a buildup of pressurized air in a void in the body around the piston between the first seal ring and the second seal ring; and wherein the pressurized air is released past the first seal ring and through the nozzle during the second portion of the blowout stroke.

* * * * *